United States Patent Office 3,293,305
Patented Dec. 20, 1966

3,293,305
POLYFLUORINATED ORGANIC COMPOUNDS
Robert N. Haszeldine, Windyridge Lyme Road, Disley, England; Alan R. Parkinson, 25 High View St., Bolton, England; and John M. Birchall, 22 Lorna Road, Cheadle Hulme, England
No Drawing. Filed Sept. 12, 1962, Ser. No. 223,266
Claims priority, application Great Britain, Sept. 18, 1961, 33,384/61
13 Claims. (Cl. 260—612)

This invention relates to polyfluorinated diaryl compounds in which one of the aryl groups is perfluorinated and the other is essentially hydrocarbon in character.

The hydrocarbon diaryls, e.g. diphenyl, are of course well known. Perfluoro diaryl compounds such as perfluorodiphenyl, $C_6F_5$—$C_6F_5$, are also known.

In accordance with the present invention, a new class of diaryl compounds having unique advantages has been discovered wherein one of the aryl groups is perfluorinated and the other is essentially hydrocarbon in character, e. g. 2, 3, 4, 5, 6-pentafluorodiphenyl, $C_6F_5$—$C_6H_5$. Such compounds have the important advantage of providing highly versatile intermediates since each of the two different aryl groups is selectively attacked by a variety of reagents to which the other group is essentially inert. Thus, the perfluorinated aryl portion is attacked by so-called nucleophilic reagents, with replacement of fluorine, while such reagents do not attack the hydrocarbon aryl group. On the other hand, the hydrocarbon aryl portion is selectively attacked by so-called electrophilic reagents which under normal conditions do not attack the perfluorinated aryl group. For example, the fluorine atoms on the perfluorinated aryl nucleus may be replaced by hydroxyl, for example, by the attack of KOH in tertiary butyl alcohol; or by alkoxy such as by the attack of sodium alkoxide in an alkanol; or by amino such as by the attack of dialkylamines on heating; or by mercapto such as by the attack of sodium sulfhydrate (NaSH) in pyridine; or by the hydrazine radical —NH—$NH_2$ such as by the attack of hydrazine hydrate in refluxing ethanol or dioxane. Such reagents produce essentially no attack on the hydrocarbon aryl portion of the molecule. On the other hand, the hydrocarbon aryl portion is readily attacked by nitric acid for example, to replace hydrogen by a nitro ($NO_2$) group; or by halogen to replace hydrogen with e.g. chlorine, bromine or iodine, or by sulfonating agents such as sulfuric acid to replace hydrogen by the sulfonic ($SO_3H$) group. Such electrophilic reagents under ordinary conditions have virtually no effect upon the perfluorinated aryl portion.

The compounds of the invention may be represented by the general formula:

$$R_f—R$$

where $R_f$ is perfluorinated aromatic radical and where R is an aromatic radical carrying hydrogen on at least half and preferably on at least two-thirds of its aromatic ring positions, the $R_f$ and R radicals being connected to one another directly through aromatic ring carbon atoms. As used herein, perfluorinated means a compound or radical containing only carbon and fluorine atoms. The term aromatic radical is understood in the usual sense as one containing a six membered carbocyclic ring having three conjugated double bonds.

The radical $R_f$ may be mononuclear as in the pentafluorophenyl, perfluorotolyl, or perfluoroxylyl radicals; or may be polynuclear radical. In the latter case, the radical $R_f$ may contain condensed rings as in the perfluoronaphthyl, the perfluoroanthracenyl or the perfluorophenanthryl radical; or may contain coupled rings as in the perfluorodiphenyl radical $C_6F_5$—$C_6F_4$— or the perfluorodiphenyl methane radical $C_6F_5$—$CF_2$—$C_6F_4$—. It may contain perfluorinated substituents such as perfluoroalkyl, e.g. $CF_3$—, $C_2F_5$— or $(CF_3)_2CF$—. Preferably, the $R_f$ radical will contain from 6 to 20 and particularly 6 to 12 carbon atoms.

The radical R, which as stated is essentially hydrocarbon in character, may be mononuclear as in the phenyl, tolyl, xylyl or ethylphenyl radicals, or may be polynuclear. In the latter case, the radical R may contain condensed rings as in the naphthyl, the anthracenyl or the phenanthryl radicals, or may contain coupled rings as in the diphenyl radical $C_6H_5$—$C_6H_4$—, the diphenyl methane radical $C_6H_5$—$CH_2$—$C_6H_4$—, or the diphenyl ether radical $C_6H_5$—O—$C_6H_4$—. The ring positions may be substituted if desired with various substituents such as alkyl, chloroalkyl, fluoroalkyl, halogen, nitrile, nitro, carboxyl, ester, alkoxy or aryloxy such as phenoxy.

Preferably the radical R has from 6 to 20 and most desirably from 6 to 12 carbon atoms. A particularly preferred group of compounds are those in which R is an aromatic hydrocarbon radical such as benzene, napthalene or anthracene, including those containing alkyl substituents such as toluene, xylene and methyl napthalene.

Typical compounds coming within the scope of the invention are the following:

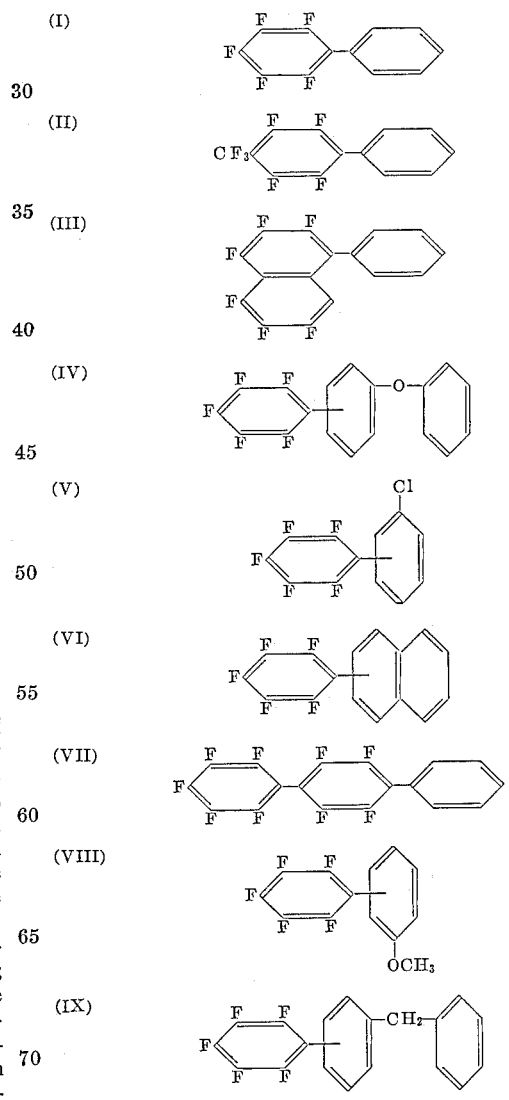

The compounds of the invention may be prepared by the reaction, in the presence of an oxidizing agent, of a perfluoroarylhydrazine (e.g. pentafluorophenylhydrazine) of the general formula $$R_f NH-NH_2$$

where $R_f$ is as defined above, and where the $-NH-NH_2$ radical is attached to an aromatic nuclear carbon atom, with an aromatic compound of the formula RH where R is an aromatic radical as previously defined. This reaction, which is described in the copending application Serial No. 223,267, filed September 12, 1962, and now abandoned, entitled "Preparation of Fluorinated Organic Compounds," Robert N. Haszeldine, Alan R. Parkinson and John M. Birchall, may be exemplified by the reaction of pentafluorophenylhydrazine with benzene in accordance with the following:

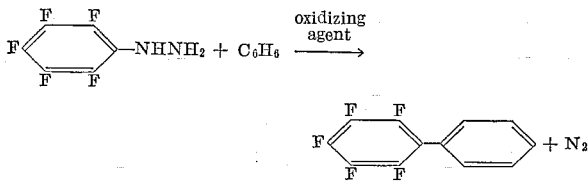

While the invention is not limited to and does not depend upon any particular reaction mechanism, it is believed that the reactions producing the novel compounds of the invention proceed through the formation of an intermediate transient diazo compound, e.g. $C_6F_5N=NH$, prepared by the oxidation of the perfluoroarylhydrazine which in turn undergoes homolytic decomposition to produce a perfluoro free radical with the evolution of nitrogen. The free radical thus formed then attacks the aromatic compound to form the desired diaryl product. The foregoing reaction mechanism may be exemplified by the oxidation of pentafluorophenylhydrazine in the presence of benzene:

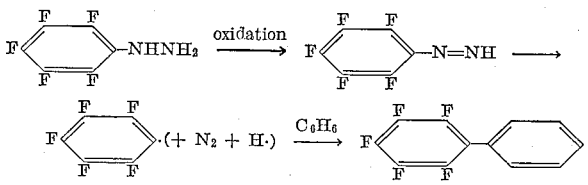

The perfluorinated aryl hydrazine starting material may be readily prepared by reaction of the corresponding perfluorinated aryl compound e.g. hexafluorobenzene, with hydrazine hydrate in an organic solvent such as ethanol or dioxane. The preparation of the hydrazine is preferably carried out in cyclic ether solvent such as dioxane since it has been found that such solvents provide almost quantitative yields of a desired fluorinated aryl hydrazine such as pentafluorophenylhydrazine. The perfluorinated aryl hydrazines are generally crystalline solids.

In general, the reaction may be carried out at temperatures ranging from about −30° C. to about 180° C. and preferably at temperatures from about −10° to about 120° C. At temperatures above about 120° C. there is a greater tendency for side reactions to occur with consequent reduced yields, and accordingly, temperatures below about 120° C. are preferred. Reaction pressure is not critical and the reaction is carried out most conveniently at atmospheric pressure although reduced or elevated pressures may be employed if desired. The mole ratios of the reactants are not critical although it will be generally preferred to employ at least a molar excess of the aromatic compound to assure high conversions of the perfluorinated aryl hydrazine. Reaction time is likewise not critical, reaction periods of from one-half to ten hours generally being sufficient to provide good conversion.

A wide variety of oxidizing agents may be employed including, for example, heavy metal oxides such as silver oxide, mercury oxide and lead dioxide; oxidizing agents of the positive halogen type, such as bleaching powder [CaOCl₂], chloramine-T (sodium para-toluenesulfonchloramine) and the hypochlorites, hypobromites and hypoiodites of alkali metals (particularly sodium and potassium) or of the alkaline earths (particularly calcium); oxidizing agents containing oxidizing anions such as permanganates, dichromates, bismuthates, vanadates, chlorates, bromates, and iodates; compounds containing higher oxidation states of polyvalent transition metals such as compounds containing the cupric, ferric and ceric ion; air or oxygen, either alone or in the presence of a catalyst such as a cupric compound; peroxides and per-acids, such as hydrogen peroxide, and peracetic acid or oxidizing acids such as nitric acid; or oxidants such as elemental chlorine or organic oxidizing agents such as quinones.

The reaction may in most cases be conveniently carried out by dissolving the solid perfluorinated aryl hydrazine in the aromatic compound and then gradually adding the oxidizing agent to the mixture with agitation. The reaction is exothermic and it may be necessary in some cases to cool the reaction mixture, e.g. by means of an ice bath, to regulate the reaction and control the rate of oxidation. Nitrogen is evolved, usually quantitatively, by oxidation of the perfluorinated aryl hydrazine. After the evolution of nitrogen ceases, it is generally desirable to raise the reaction temperature to insure completeness of reaction. In some cases, it may be desirable to employ a relatively inert solvent (i.e. one which is not appreciably attacked by either of the reactants) in which the perfluorinated aryl hydrazine and the aromatic compound are mutually soluble, e.g. a hydrocarbon solvent such as cyclohexane or hexane; a halogenated hydrocarbon such as $CCl_4$, $CHCl_3$; or carbon disulphide. Alternatively, when a coupling solvent is not available or is not used, the reactants may be dispersed in a relatively inert liquid and agitated together with the oxidizing agent. In most cases it is preferred to conduct the reaction under substantially anhydrous conditions, since in the presence of water, by-products such as pentafluorobenzene and/or tetrafluorobenzene (in the case of pentafluorophenylhydrazine) tend to be produced. However, the use of aqueous oxidizing agents is not excluded. When such oxidizing agents are used the aromatic compound (e.g. benzene) is preferably shaken vigorously with the aqueous medium to ensure adequate contact between the aromatic compound and the attacking polyfluoroaryl radicals.

The following examples are intended to illustrate the invention.

*Example 1.—Preparation of 2, 3, 4, 5, 6-pentafluorodiphenyl*

To a flask equipped with a reflux condenser and stirrer there is introduced 10 g. (0.0505 mole) of pentafluorophenyl hydrazine dissolved in 150 ml. of benzene. To this solution there is added gradually with vigorous stirring 12 g. (0.052 mole) of silver oxide. After a brief induction period of two to three minutes following the initial addition of silver oxide, the reaction becomes vigorous and is controlled by cooling in ice. The mixture is then heated slowly to 80° C. and refluxed for one hour with additional silver oxide (6.0 g.). During the reaction, 1100 ml. of nitrogen (98% theory) is evolved.

The reaction mixture is then filtered, the filtrate dried over anhydrous magnesium sulfate and unreacted benzene distilled off to leave a crystalline residue which is dissolved in ether and the ether solution then washed with 5 normal hydrochloric acid, aqueous 5 normal sodium hydroxide and water, and then dried over anhydrous magnesium sulfate. After distilling off the ether, the residue is recrystallized from ethanol and sublimed in vacuo at 100° C. to give 7.75 g. (63% yield) of 2,3,4,5,6-pentafluorodiphenyl, white plates melting at 110.5–112° C. *Analysis*—Calculated for $C_{12}H_5F_5$: C, 59.0; H, 2.0. Found: C, 58.8; H, 1.8.

Example 2.—Preparation of 2,3,4,5,6-pentafluorophenylnaphthalene

To a flask equipped with a stirrer and reflux condenser, there is introduced 10.0 g. (0.0505 mole) of pentafluorophenylhydrazine and 50 g. (0.39 mole) of naphthalene dissolved in 100 ml. of $CCl_4$. To this solution there is added slowly with stirring 23.4 g. of silver oxide over a period of 3 hours and the solution is then stirred while heating under reflux with additional silver oxide. The reaction mixture is filtered, the solvent and diluent is evaporated, the excess of naphthalene is distilled off under reduced pressure and the residue is recrystallized from ethanol to give a good yield of 2,3,4,5,6-pentafluorophenylnaphthalene.

Example 3.—Preparation of (pentafluorophenyl)phenoxybenzenes

Pentafluorophenylhydrazine (10.0 g., 0.0505 mole) is added over two hours to a stirred suspension of silver oxide (23.4 g., 0.10 mole) in diphenyl ether (150 ml.) at 30–40° C. Evolution of nitrogen (1130 ml., 100%) begins after 2–3 minutes, continues throughout the addition, and ceases only when the temperature of the mixture is raised to 100° C. The products are filtered, and the filtrate is dried and distilled under reduced pressure to remove diphenyl ether, B.P. 143° C. at 15 mm. Hg. Continuation of the distillation gives a colorless oil (10.2 g.), B.P. 110–140° C. at 2 mm. Hg which on redistillation gives two solid fractions: (a) B.P. 115–120° C. at 2 mm. Hg (4.0 g.), and (b) B.P. 120–135° C. at 2 mm. Hg (6.0 g.). Both fractions are recrystallized from aqueous methanol to give crystalline solids consisting of isomers of (pentafluorophenyl)phenoxybenzene, viz:

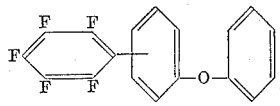

Fraction (a) melts at 61.5°–72° C. *Analysis*—Calculated for $C_{18}H_9F_5O$: C, 64.3; H, 2.7. Found: C, 63.8; H, 3.1. Fraction (b) melts at 65°–72° C. *Analysis*—Calculated for $C_{18}H_9F_5O$: C, 64.3; H, 2.7. Found: C, 65.3; H, 3.1.

The infrared spectra of these materials are similar and are consistent with those expected for mixtures of isomers of (pentafluorophenyl)phenoxybenzene. The yield is 60%.

Example 4.—Preparation of 2,3,4,5,6-pentafluorophenylmonochlorobenzene

Following the procedures of the previous examples, 10.0 grams (0.0505 mole) of pentafluorophenylhydrazine is dissolved in 50 milliliters of monochlorobenzene. To the solution there is slowly added with stirring, 25 grams of bleaching powder ($CaOCl_2$) while maintaining a temperature of 20° to 30° C. over a period of 3 hours. The reaction mixture is then warmed to a temperature of about 80° C. for 30 minutes with more bleaching powder (about 5 grams). The mixture is filtered, the filtrate is dried, the solvent is then removed by distillation and the residue distilled to give a good yield of 2,3,4,5,6-pentafluorophenylmonochlorobenzene;

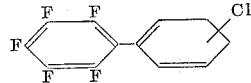

boiling at 135° C. at 15 mm. Hg.

Example 5.—Preparation of perfluoronaphthylbenzene

Following the procedures of the previous examples, when perfluoronaphthylhydrazine is added to a twenty times molar excess of benzene, and to this mixture, while stirring vigorously, there is added a 100% excess of bleaching powder over a period of several hours, following which the mixture is heated at reflux temperature for an hour with the addition of more bleaching powder, a solid product is obtained which after purification gives a yield of phenylheptafluoronaphthalene, $C_6H_5$—$C_{10}F_7$.

Example 6.—Preparation of tolyl-nonafluorodiphenyl

Following the procedures of the previous examples, when nonafluorodiphenylhydrazine is dissolved in a 200% excess of toluene and through this solution there is gradually passed over a period of 12 hours a stream of oxygen gas while maintaining the reaction temperature in the range of from about 0° to 30° C. there is obtained after filtering, drying and recrystallization a good yield of tolyl-nonafluorodiphenyl

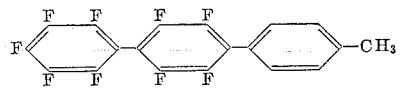

Example 7.—Preparation of pentafluorophenyldiphenylmethane

Following the procedures of the previous examples, 10.0 grams (0.0505 mole) of pentafluorophenylhydrazine, 50 grams of diphenylmethane in 100 milliliters of carbon tetrachloride are placed in a flask equipped with a stirrer and reflux condenser. To this mixture there is slowly added with stirring 25 grams of bleaching powder ($CaOCl_2$) while maintaining a temperature of 0° to 30° C. over a period of several hours. The reaction mixture is then warmed to reflux temperature and held there for an additional several hours with the addition of about 5 grams more bleaching powder. After isolation of the product and recrystallization there is obtained a good yield of pentafluorophenyldiphenylmethane

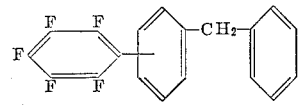

Example 8. — Preparation of 4-trifluoromethyl-2,3,5,6-tetrafluorodiphenyl

Into a flask equipped with a stirrer and reflux condenser, there is introduced 4-trifluoromethyl-2,3,5,6-tetrafluorophenyl hydrazine dissolved in a 150% excess of benzene. To this solution there is gradually added over a period of 4 hours a 50% excess of silver oxide while maintaining the reaction temperature in the range of from about 0 to 30° C. The reaction mixture is then warmed to reflux for an additional 2 hours with the addition of more silver oxide. After filtering, drying and recrystallization, there is obtained good yield of 4-trifluoromethyl-2,3,5,6-pentafluorodiphenyl:

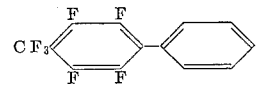

Example 9.—Preparation of methyl pentafluorobiphenylcarboxylate

Silver oxide (12.0 g., 0.052 mole) is gradually added with vigorous stirring to pentafluorophenylhydrazine (10.0 g., 0.0505 mole) in methyl benzoate (150 ml.). The reaction is controlled by cooling in ice. The mixture is then heated slowly to 80° C., more silver oxide (6.0 g.) is added, and the temperature maintained at 80° C. for one hour. The mixture is cooled and filtered, and the excess of methyl benzoate is removed by distillation under reduced pressure. The residue is recrystallized and gives a good yield of methyl pentafluorobiphenylcarboxylate

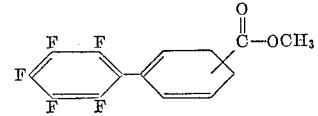

As pointed out previously, the compounds of the invention provide reactive intermediates of high degree of versatility since each of the aryl portions is attacked selectively by a different set of reagents. Thus, the compound of the invention 2,3,4,5,6-pentafluorodiphenyl, $C_6F_5$—$C_6H_5$, may readily be converted to 2,3,4,5,6-pentafluoronitrodiphenyl with no attack on the pentafluorophenyl portion by nitration with fuming nitric acid (electrophilic attack) in accordance with the following example.

*Example 10.*—*Preparation of 2,3,4,5,6-pentafluoronitrobiphenyl*

Twenty milliliters of fuming nitric acid (density=1.5) is carefully added to 2,3,4,5,6-pentafluorobiphenyl (5 g.) and the mixture is stirred for 1 hour, then poured into water (100 ml.). The mixture is cooled, and the solid which separates is purified by sublimation in vacuo and recrystallization from ethanol, to give 2,3,4,5,6-pentafluoronitrobiphenyl

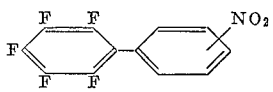

having a melting point of 46°–48° C. *Analysis.*—Calculated for $C_{12}F_5H_4NO_2$: C, 49.9; H, 1.4; N, 4.8. Found: C, 49.8; H, 1.6; N, 4.9.

As another example, the compound of the invention 2,3,4,5,6-pentafluorodiphenyl may readily be converted to tetrafluorohydroxydiphenyl with no attack on the hydrocarbon aryl portion by reaction with KOH in tertiary butanol (nucleophilic attack) as illustrated by the following example.

*Example 11.*—*Preparation of tetrafluorohydroxydiphenyl*

2,3,4,5,6-pentafluorodiphenyl (10.0 g., 0.041 mole), potassium hydroxide (5.6 g., 0.10 mole), and t-butanol (100 ml.) are heated under reflux for two hours. Water (600 ml.) is added, the t-butanol is distilled off, and the residual aqueous phase is cooled and acidified with 5 N hydrochloric acid. The precipitated solid is filtered off and purified by reprecipitation and recrystallization to give a good yield of tetrafluorohydroxydiphenyl ($C_6F_4OH$—$C_6H_5$)

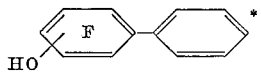

*The F in the center of the benzene ring indicates that all unsubstituted positions are occupied by fluorine.

The hydroxy compound prepared as described above may be readily converted to a phosphate ester e.g. tris (tetrafluorodiphenyl)phosphate

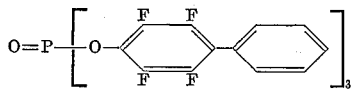

by reaction with phosphorus pentachloride and sodium hydroxide.

As a further example of the methoxy group may be introduced into 2,3,4,5,6-pentafluorodiphenyl by reaction with potassium methoxide in methanol (nucleophilic attack) with no attack on the hydrocarbon aryl portion, as illustrated by the following example.

*Example 12.*—*Preparation of tetrafluoromethoxydiphenyl*

2,3,4,5,6-pentafluorodiphenyl (10.0 g., 0.041 mole) and normal potassium methoxide in methanol (100 ml.) are heated under reflux for four hours. The mixture is poured into water (300 ml.) and the precipitate is collected and recrystallized to give a good yield of tetrafluoromethoxybenzene ($C_6F_4OCH_3$—$C_6H_5$)

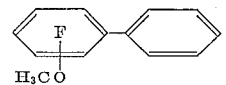

As a still further example, the hydrocarbon nucleus of 2,3,4,5,6-pentafluorodiphenyl may be selectively substituted by a phenyl radical to form a terphenyl e.g. by reaction with benzoyl peroxide (free radical attack) as illustrated by the following:

*Example 13.*—*Preparation of 2,3,4,5,6-pentafluorophenyl*

Benzoyl peroxide (5 g., 0.2 mole) is added gradually to vigorously stirred 2,3,4,5,6-pentafluorodiphenyl (10 g., 0.041 mole), maintained at 120° C. The mixture is stirred at 120° C. for ten hours after the addition, then poured into an excess of vigorously stirred aqueous 2 N sodium hydroxide. The mixture is cooled and filtered, and the residue is steam-distilled to remove unreacted pentafluorodiphenyl. The residue from the steam-distillation is dried and recrystallized and yields 2,3,4,5,6-pentafluoroterphenyl.

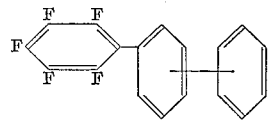

Still another example of the selective reactions possible with the compounds of the invention is the reaction of 2,3,4,5,6-pentafluorodiphenyl with phenyl lithium (nucleophilic attack) to substitute selectively a phenyl radical in the perfluorinated nucleus to form another type of terphenyl as illustrated by the following:

*Example 14.* — *Preparation of 2′,3′,5′,6′-tetrafluoroterphenyl*

Phenyl lithium in diethyl ether (100 ml. of 1.4 N solution) is added under nitrogen to a stirred solution of 2,3,4,5,6-pentafluorodiphenyl (29.3 g., 0.12 mole) in diethyl ether (100 ml.) at such a rate as to maintain gentle refluxing. The mixture is heated under reflux for a further two hours, then cooled and poured into water (250 ml.) containing 5 N hydrochloric acid (50 ml.). The well-stirred mixture is filtered, and the ethereal layer of the filtrate is dried over anhydrous magnesium sulfate and evaporated. The residue from the filtration is combined with that from the ethereal solution, and the total is recrystallized from benzene to give a good yield of 2′,3′,5′,6′-tetrafluoroterphenyl, M.P. 254–257° C.

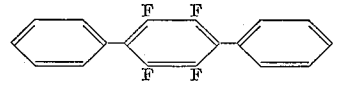

Still another example of the selective reactivity of the compounds of the invention is the selective attack of piperidine (nucleophilic attack) on the perfluorinated nucleus of 2,3,4,5,6-pentafluorodiphenyl as illustrated by the following:

*Example 15.*—*Preparation of piperidyltetrafluorobiphenyl*

2,3,4,5,6-pentafluorobiphenyl and piperidine are heated together on a steam bath for 1 hour, and the mixture is then poured into water. The precipitated solid is filtered off, dried, and recrystallized from ethanol to give needles of piperidyltetrafluorobiphenyl, M.P. 163–163.5° C.

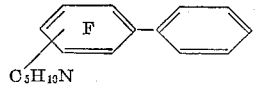

By virtue of the selective reactivity of the compounds of the invention as exemplified above, bifunctional compounds with functional groups of different types on the perfluorinated and hydrocarbon aryl groups respectively may be readily prepared. Thus, for example, methyl pentafluorobiphenylcarboxylate, prepared as described above, particularly the para-isomer, is a useful precursor of bifunctional compounds which may be readily polymerized to give potentially useful polymers. Thus, if the ester is heated under pressure with concentrated aqueous ammonia, an amino-group is introduced into the fluoroaromatic ring and the ester grouping is converted to an amide, giving the structure $$H_2N-C_6F_4-C_6H_4-CO\cdot NH_2$$

Hydrolysis of this compound with hot dilute aqueous alkali give the amino-acid $$H_2N-C_6F_4-C_6H_4-COOH$$

which on strong heating is converted into the polymer $$-[-HN-C_6F_4-C_6H_4-CO-]_n-$$

As another example, the compound of the invention, 2,3,4,5,6-pentafluorodiphenyl, $C_6F_5$—$C_6H_5$, may be readily converted to bifunctional derivatives such as 2,3,5,6-tetrafluoro-4-hydroxy-4'-aminodiphenyl $$HO-C_6F_4-C_6H_4-NH_2$$

by first selectively nitrating the hydrocarbon phenyl portion, then treating the nitro-compound with KOH in tertiary butyl alcohol and finally reducing the nitro group to amine. The resulting compound is a valuable intermediate for the production of polyfluorinated condensation polymers.

In a similar manner, other useful polymers may be derived from the compounds of the invention by processes which depend primarily on the different susceptibilities of the two rings to chemical attack. Thus, polyethers may be prepared from 2,3,4,5,6-pentafluorodiphenyl by the following series of reactions:

(a) $F-C_6F_4-C_6H_5 \xrightarrow{HNO_3} F-C_6F_4-C_6H_4-NO_2$ (b) $F-C_6F_4-C_6H_4-NO_2 \xrightarrow{\text{reduction, tin in HCl}} F-C_6F_4-C_6H_4-NH_2$ (c) $F-C_6F_4-C_6H_4-NH_2 \xrightarrow{\text{diazotization and hydrolysis}} F-C_6F_4-C_6H_4-OH$ (d) $F-C_6F_4-C_6H_4-OH \xrightarrow{\text{heat}}$ $$-[-C_6F_4-C_6H_4-O-C_6F_4-C_6H_4-O-]_n-$$

Polyesters may be formed by the following series of reactions:

(a) $F-C_6F_4-C_6H_5 \xrightarrow{\text{bromination}} F-C_6F_4-C_6H_4-Br$ (b) $F-C_6F_4-C_6H_4-Br \xrightarrow{\text{Mg in ether}} F-C_6F_4-C_6H_4-MgBr$ (c) $F-C_6F_4-C_6H_4-MgBr \xrightarrow{CO_2 \text{ and acid by hydrolysis}} F-C_6F_4-C_6H_4-COOH$ (d) $F-C_6F_4-C_6H_4-COOH \xrightarrow{\text{KOH in t-butanol}} OH-C_6F_4-C_6H_4-COOH$ (e) $OH-C_6F_4-C_6H_4-COOH \xrightarrow{\text{acidic catalyst}}$ $$-[-C_6F_4-C_6H_4-C(=O)-O-]_n-$$

As well as being valuable intermediates of highly selective reactivity, the compounds of the invention are also useful as chemically and thermally stable hydraulic fluids. In this respect they are superior to the hydrocarbon diaryls in thermal stability and non-flammability characteristics. They have the advantage over the completed fluorinated diaryls of better compatibility with hydrocarbon fluids, permitting their use in combination with such materials.

It is to be understood that the foregoing description and specific embodiments are intended to be illustrative of the invention and that variations and modifications in addition to those specifically disclosed are included within the scope of the invention.

We claim:
1. A compound of the formula $R_f$—R, where $R_f$ is a perfluorinated aromatic radical selected from the group consisting of perfluorophenyl, perfluoronaphthyl, perfluoroanthracenyl, perfluorophenanthryl, perfluorodiphenyl, perfluorodiphenylmethane and perfluoro-lower alkylphenyl, R is an aromatic radical selected from the group consisting of phenyl, xylyl, naphthyl, methyl naphthyl, anthracenyl, phenanthryl, diphenyl, diphenyl methane, diphenyl ether, chlorophenyl, methoxyphenyl, and nitrophenyl, and the $R_f$ and R radicals are connected to one another directly through aromatic ring carbon atoms.
2. 2,3,4,5,6-pentafluorodiphenyl.

3. 2,3,4,5,6-pentafluorophenylphenoxybenzene.
4. 2,3,4,5,6-pentafluorophenylmonochlorobenzene.

5. A method for preparing polyfluorinated diaryl compounds which comprises the step of reacting in the presence of an oxidizing agent at a temperature of −30° C. to +180° C. a polyfluorinated aryl hydrazine having the formula R—NHNH$_2$, where R is a carbocyclic aromatic radical attached to the hydrazine group through an aromatic ring carbon atom and carrying fluorine on at least half of its ring positions, with a carbocyclic aromatic compound having at least one 6-membered ring containing three conjugated double bonds and carrying hydrogen on at least half of its ring positions.

6. A method in accordance with claim 5 in which said polyfluorinated aryl hydrazine contains from 6 to 20 carbon atoms.

7. A method in accordance with claim 5 in which said aryl hydrazine is perfluorinated.

8. A method in accordance with claim 5 in which said aryl hydrazine is pentafluorophenylhydrazine.

9. A method in accordance with claim 5 in which said aromatic compound contains from 6 to 20 carbon atoms and is selected from the class consisting of aromatic hydrocarbons and hydrocarbon diarylethers.

10. A method for preparing polyfluorinated diaryl compounds which comprises the step of reacting in the presence of an oxidizing agent at a temperature of −30° C. to +180° C., a perfluorinated aryl hydrazine having the formula R—NHNH$_2$, where R is a perfluorinated carbocyclic aromatic radical attached to the hydrazine group through an aromatic ring carbon atom, with an aromatic compound containing from 6 to 20 carbon atoms selected from the class consisting of aromatic hydrocarbons and hydrocarbon diarylethers.

11. A method in accordance with claim 10 in which said oxidizing agent is a heavy metal oxide.

12. A method in accordance with claim 10 in which said perfluorinated aryl hydrazine is pentafluorophenylhydrazine.

13. A method in accordance with claim 10 in which said perfluorinated aryl hydrazine is pentafluorophenylhydrazine and in which said aromatic compound is benzene.

References Cited by the Examiner
UNITED STATES PATENTS

| | | | |
|---|---|---|---|
| 2,028,081 | 1/1936 | Stoesser | 260—612 |
| 2,095,619 | 10/1937 | Stoesser | 260—612 |
| 2,977,516 | 3/1961 | Wiengarten | 260—649 X |
| 3,046,313 | 7/1962 | Pummer et al. | 260—649 X |

LEON ZITVER, *Primary Examiner.*
B. HELFIN, *Assistant Examiner.*